United States Patent
Kim et al.

(10) Patent No.: US 8,953,498 B2
(45) Date of Patent: Feb. 10, 2015

(54) METHOD AND APPARATUS OF ACTIVE SCANNING IN WIRELESS LOCAL AREA NETWORK

(75) Inventors: Eun Sun Kim, Gyeonggi-do (KR); Yong Ho Seok, Gyeonggi-do (KR); Dae Won Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 148 days.

(21) Appl. No.: 13/574,370

(22) PCT Filed: Oct. 26, 2010

(86) PCT No.: PCT/KR2010/007386
§ 371 (c)(1),
(2), (4) Date: Aug. 27, 2012

(87) PCT Pub. No.: WO2011/090257
PCT Pub. Date: Jul. 28, 2011

(65) Prior Publication Data
US 2012/0307685 A1 Dec. 6, 2012

Related U.S. Application Data

(60) Provisional application No. 61/296,483, filed on Jan. 20, 2010, provisional application No. 61/305,545, filed on Feb. 18, 2010, provisional application No. 61/311,778, filed on Mar. 9, 2010, provisional application No. 61/313,128, filed on Mar. 12, 2010, provisional application No. 61/314,953, filed on Mar. 17, 2010.

(30) Foreign Application Priority Data

Jun. 28, 2010 (KR) .......................... 10-2010-0061282

(51) Int. Cl.
*H04L 12/28* (2006.01)
*H04W 48/16* (2009.01)
*H04W 84/12* (2009.01)
*H04W 88/04* (2009.01)

(52) U.S. Cl.
CPC .............. *H04W 48/16* (2013.01); *H04W 84/12* (2013.01); *H04W 88/04* (2013.01)
USPC ............................................ 370/255; 370/328

(58) Field of Classification Search
USPC .................................................. 370/255, 328
See application file for complete search history.

(56) References Cited

U.S. PATENT DOCUMENTS

| | | | |
|---|---|---|---|
| 2006/0029028 A1 | 2/2006 | Kim et al. | |
| 2007/0189249 A1* | 8/2007 | Gurevich et al. | 370/338 |
| 2008/0058031 A1 | 3/2008 | Deprun | |
| 2008/0298333 A1 | 12/2008 | Seok | |
| 2012/0230312 A1* | 9/2012 | Masuda | 370/338 |

FOREIGN PATENT DOCUMENTS

| | | | |
|---|---|---|---|
| EP | 1916802 A1 | 4/2008 | |
| KR | 10-2009-0132650 A | 12/2009 | |

OTHER PUBLICATIONS

International Search Report and Written Opinion issued in corresponding International Application No. PCT/KR2010/007386 dated Jun. 15, 2011.

* cited by examiner

*Primary Examiner* — Sai-Ming Chan
(74) *Attorney, Agent, or Firm* — Morgan, Lewis & Bockius LLP

(57) ABSTRACT

Provided are a method and apparatus for scanning of a station in a wireless local area network. The method includes: receiving a probe request frame including probe request relaying information from a probe requesting station (PRSTA) initiating the active scanning, determining whether to discard the probe request frame (PRF) when a frame related to relaying of the PRF is received, determining whether to relay the PRF, and relaying the PRF to an access point if it is determined to relay the PRF, the probe request relaying information including: a transmitter address field indicating an address of a station (STA) transmitting the PRF, and a PRSTA address field indicating an address of the PRSTA, wherein discarding of the PRF is determined by comparing one of the transmitter address field or the PRSTA address field with information included in the frame related to the PRF.

15 Claims, 12 Drawing Sheets

METHOD AND APPARATUS OF ACTIVE SCANNING IN WIRELESS LOCAL AREA NETWORK

This is a U.S. National Phase Entry of PCT Application No. PCT/KR2010/007386, filed Oct. 26, 2010, and claims the benefit of Korean Patent Application No. 10-2010-0061282 filed Jun. 28, 2010 and claims the benefit of U.S. Provisional Applications Nos. 61/314,953 filed Mar. 17, 2010, 61/313,128 filed Mar. 12, 2010, 61/311,778 filed Mar. 9, 2010, 61/305,545 filed Feb. 18, 2010, and 61/296,483 filed Jan. 20, 2010.

TECHNICAL FIELD

The present invention relates to wireless communications, and more particularly, to a method and apparatus for scanning of a station in a wireless local area network (WLAN).

BACKGROUND ART

With recent development of information and communications technology, various wireless communications technology has been developed. Among them, a wireless local area network (WLAN) is technology that allows portable user equipment such as a personal digital assistant (PDA), a laptop computer, a portable multimedia player (PMP), etc. in a home, an enterprise or a certain service providing zone to have wireless access to high-speed Internet on the basis of radio frequency technology.

It is presupposed that communications in the WLAN based on institute of electrical and electronics engineers (IEEE) 802.11 standards are performed within a zone called a basic service set (BSS). The BSS zone has a somewhat indefinite boundary since it may vary depending on propagating characteristics of a wireless medium. Such a BSS is basically divided into two configurations of an independent BSS (IBSS) and an infrastructure BSS. The former indicates a BSS that forms a self-contained network and does not allows access to a distribution system (DS), and the latter indicates a BSS that includes one or more access points (AP), a distribution system, etc. and generally employs the AP in all communications including communication between stations.

The station (STA) having desire to access a wireless network may use two scanning methods for searching an accessible wireless network (BSS or IBSS), i.e., a candidate AP or the like.

One is passive scanning, which uses a beacon frame transmitted from the AP (or STA). That is, the STA having desire to access a wireless network periodically receives the beacon frames from the AP or the like managing a relevant BSS (or IBSS), thereby finding the accessible BSS or IBSS.

The other is active scanning. The STA having desire to access the wireless network first transmits a probe request frame. Then, the STA or AP that receives the probe request frame responds with a probe response frame.

There are frequency bands that can be shared by other kinds of wireless communication systems, one of which is a television white space (TV WS). The TV WS is an idle frequency band remained as an analog TV becomes digitalized, and this band corresponds to a spectrum of 54~698 MHz assigned for TV broadcasting. If a licensed device having priority to use a relevant frequency domain does not use this frequency band, an unlicensed device can use this frequency band.

If the IEEE 802.11 is applied to the TV WS, there is an advantage that coverage is noticeably extended due to the spectrum characteristics of the TV WS. However, in general, if the coverage is extended, the number of STAs within the coverage is definitely increased. As the number of STAs increases, a method for flexibly managing users, i.e., scalability becomes an object of concern. Further, since various wireless communication systems and various unlicensed devices coexist, a problem of co-existence occurs. If distributed coordination function (DCF) and enhanced distributed cannel access (EDCA) protocols of IEEE 802.11 are applied to this environment, the problem of scalability may grow worse.

The DCF is a channel access mechanism used in IEEE 802.11 and based on carrier sense multiple access/collision avoidance (CSMA/CA). Also, the EDCA corresponds to a competition-based medium access method among channel access models proposed in a hybrid coordination function (HCF) provided by extension of a general medium access control protocol. The HCF is a protocol provided by IEEE 802.11e proposed to guarantee quality of service (QoS).

To use the TV WS, an unlicensed device has to get a channel available in a relevant zone on the basis of geo-location database. Also, there is a need for scanning to solve the problem of coexistence between the unlicensed devices using the TV WS.

In the WLAN supporting a TV WS band, the STA performs a scanning procedure for accessing the BSS. Scanning coverage of the STA is limited by transmission power. The transmission power for the scanning in the TV WS is lower than that of after associating with the AP. This is to prevent interference with authenticated equipment in the scanning procedure.

Accordingly, there is a need for a method of solving coverage imbalance due to difference between the transmission power for the scanning and transmission power in a client of the AP.

SUMMARY OF INVENTION

Technical Problem

The present invention provides a method and apparatus for performing active scanning in a wireless local area network (WLAN).

Also, the present invention provides a method and apparatus for performing active scanning that supports a television white space (TV WS) in the WLAN.

Solution to Problem

In an aspect of the invention, there is provided a method for active scanning in a wireless local area network (WLAN). The method includes receiving a probe request frame including probe request relaying information from a probe requesting station (STA) initiating the active scanning, determining whether to relay the probe request frame and relaying the probe request frame to an access point (AP) if it is determined to relay the probe request frame. The probe request relaying information includes a transmitter address field that indicates an address of an STA transmitting the probe request frame and a probe requesting STA address field that indicates an address of the probe requesting STA.

An address of the STA indicated by the transmitter address field may be equal to an address of the probe requesting STA.

An address of the STA indicated by the transmitter address field may not be equal to an address of the probe requesting STA.

The probe request frame is relayed if the frame request frame may not be discarded.

The method may further include receiving a probe confirm frame to confirm that the active scanning is performed, the frame request frame may be discarded if an address of an STA transmitting the probe confirm frame is equal to an address of the probe requesting STA.

The method may further include receiving a new probe request frame, and the frame request frame may be discarded if an address of a probe requesting STA within the new probe confirm frame is equal to an address of the probe requesting STA.

The method may further include receiving a probe response frame from the AP, and the frame request frame may be discarded if an address of a probe requesting STA within the probe response frame is equal to an address of the probe requesting STA.

The method may further include receiving a probe relay confirm frame for notifying that a probe request is relayed, the probe relay confirm frame may include a transmitter address field indicating an address of a STA transmitting the probe relay confirm frame, and the frame request frame may be discarded if an STA indicated by a transmitter address field within the probe request relaying information is equal to an STA indicated by a transmitter address field within the probe relay confirm frame.

A discard timer may start when the probe response frame is received, and the frame request frame may be discarded when the discard timer expires.

In another aspect of the invention, there is provided a wireless apparatus for performing active scanning in a wireless local area network (WLAN). The apparatus includes a memory which stores a received probe request frame and a processor which is connected to the memory, determines whether to discard the probe request frame, and determines to relay the probe request frame to an access point (AP) if the probe request frame is not discarded. The probe request frame includes probe request relaying information, and the probe request relaying information includes a transmitter address field that indicates an address of an STA transmitting the probe request frame, and a probe requesting STA address field that indicates an address of the probe requesting STA.

The processor may discard the frame request frame if an address of an STA transmitting a probe confirm frame, which confirms that the active scanning is performed, is equal to an address of the probe requesting STA.

The processor may discard the frame request frame if an address of a probe requesting STA within a new probe confirm frame is equal to an address of the probe requesting STA.

The processor may discard the frame request frame if an address of a probe requesting STA within a probe response frame received from the AP is equal to an address of the probe requesting STA.

The processor may discard the frame request frame if a transmitter address field indicating an address of an STA transmitting a probe relay confirm frame within the probe relay confirm frame for notifying that a probe request is relayed is equal to a transmitter address field within the probe relay confirm frame.

A discard timer may start when the probe response frame is received, and the frame request frame may be discarded when the discard timer expires.

Advantageous Effects of Invention

Imbalance between scanning coverage and service coverage in a TV WS is solved to thereby more efficiently perform scanning.

MODE FOR THE INVENTION

Hereinafter, a scanning method and apparatus related to a wireless local area network (WLAN) system using a television white space (TV WS) band will be described by way of example for easily explaining the present invention, but scope of the present invention is not limited thereto. Alternatively, it can be applied to any wireless communication system where coverage imbalance due to difference in transmission power may occur.

Figure 1:
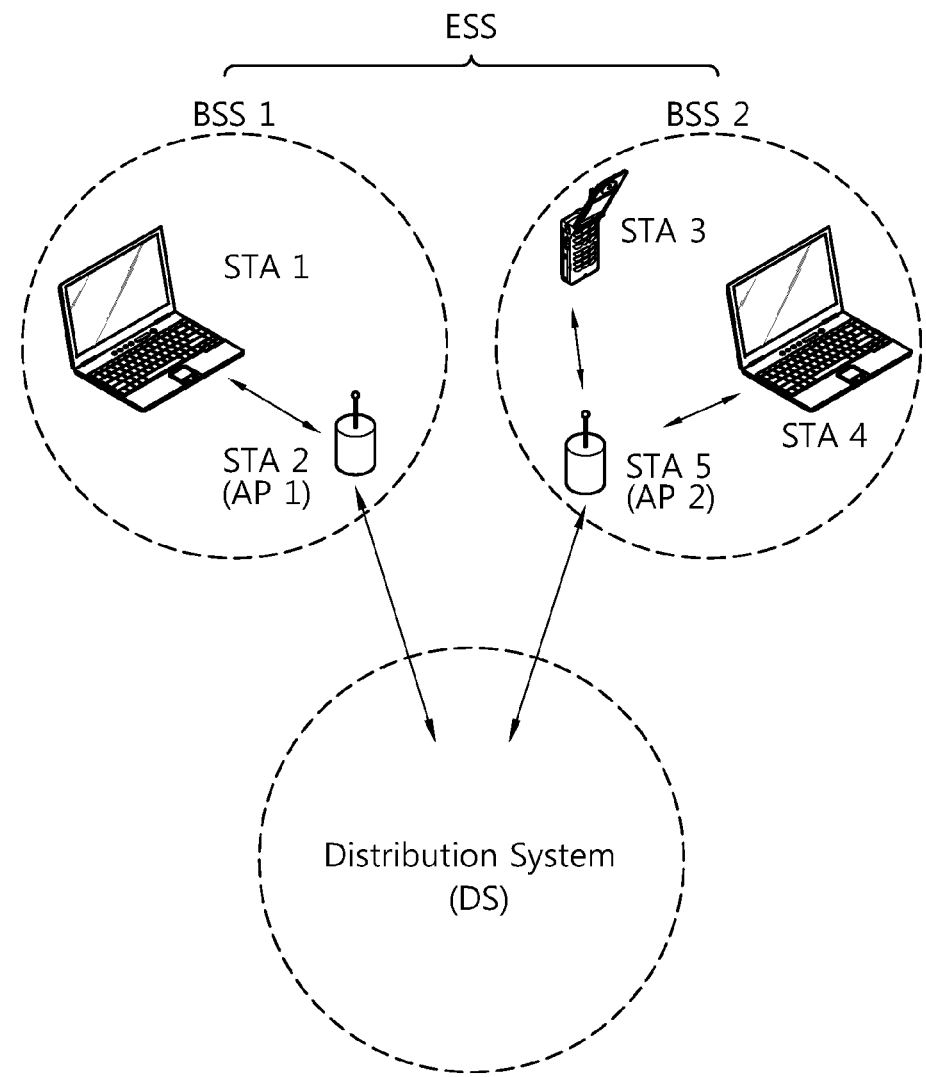
FIG. 1 shows configuration of a wireless local area network (WLAN) system according to an exemplary embodiment of the present invention.

FIG. 1 shows configuration of a wireless local area network (WLAN) system according to an exemplary embodiment of the present invention.

Referring to FIG. 1, the WLAN system includes one or more basic service set (BSS). The BSS is a group of stations (STA) which can successfully synchronize and communicate with one another, and does not mean a certain zone.

An infrastructure BSS (BSS1, BSS2) includes one or more non-access point (AP) STAs (non-AP STA1, non-AP STA2, non-AP STA2); APs (AP STA1, AP STA2) providing distribution service; and a distribution system (DS) connecting the plurality of APs (AP STA1, AP STA2). In the infrastructure BSS, the AP manages the non AP STAs.

On the other hand, an independent BSS (IBSS) is a BSS that operates in an Ad-Hoc mode. Since the IBSS does not include the AP, there is no centralized management entity that performs centralized management. That is, in the IBSS, the non-AP STAs are managed in a distributed manner. In the IBSS, all STAs may be provided as mobile STAs and constitute a self-contained network since access to the DS is not allowed.

The STA is a predetermined functional medium having a medium access control (MAC) and a physical layer interface for a wireless medium, based on institute of electrical and electronics engineers (IEEE) 802.11 standards, which broadly includes both the AP and the non-AP STA.

The non-AP STA is not the AP but the STA, the STA may also refer to the non-AP STA. Further, the non-AP STA may be called a mobile terminal, a wireless transmit/receive unit (WTRU), user equipment (UE), a mobile station (MS), a mobile subscriber unit, or the like.

The AP is a functional entity that provides access to the DS via a wireless medium for the STA associated with the AP. In the infrastructure BSS including the AP, communication between the non-AP STAs is basically performed via the AP, but direct communication between the non-AP STAs may be possible if a direct link is set. The AP may be also called a central controller, a base station (BS), a node-B, a base transceiver system (BTS), a cite controller, or the like.

The plurality of infrastructure BSSs may be connected to one another through the distribution system (DS). The plurality of BSSs connected through the DS is called an extended service set (ESS). The STAs included in the ESS can communicate with one another, and the non-AP STAs within one ESS can move from one BSS to another BSS while performing the communication without disconnection.

The DS is a mechanism that enables one AP to communicate with another AP. Through the DS, the AP can transmit a frame for the STAs associated with the BS managed by the AP, transmit a frame when one STA moves to another BSS, or transmit a frame to an external network such as a wired network or the like. The DS is not necessarily a network, but may be achieved without any limitation as long as it can provide predetermined distribution service based on IEEE 802.11. For example, the DS may be a wireless network such as a mesh network, or a physical structure connecting the APs with one another.

A television white space (TV WS) is an idle frequency band remained as an analog TV becomes digitalized in U.S.A, and corresponds to a band of 54~698 MHz. However, this is nothing but an example. The TV WS may be an authorized band that can be first used by a licensed user. The licensed user indicates a user allowed to use the authorized band, and may be also called a licensed device, a primary user, an incumbent user, or the like.

The STA that supports a TV WS band and is not licensed is called a WS STA. Further, the AP that supports a TV WS band and is not licensed is called a WS AP.

The WS AP or WS STA operating in the TV WS has to provide a protection function for a licensed user, the reason of which is because the licensed user has priority in using the WS TV band. For example, if the licensed user is already using a certain channel of the TV WS band, the corresponding channel is not allowed to the WS AP or the WS STA in order to protect the licensed user.

Therefore, the WS AP or the WS STA has to previously undergo a procedure of determining whether a certain channel is available in the TV WS, i.e., whether the corresponding channel is occupied by the licensed user. The determination of whether the licensed user is using the corresponding channel is called channel sensing.

The AP may perform sensing with regard to each channel of the TV WS band, or as necessary may request the WS STA to make a report of result from sensing a certain channel.

Through this, the AP grasps a state of each channel and makes the WS STA move to another available channel if the channel being currently used by the WS STA is not available any more due to entry of the licensed user. Alternatively, if the channel being currently used by the WS STA is not available any more, the AP may previously set a reserve channel and inform the STA of the reserve channel.

Meanwhile, as opposed to the WS AP, the WS STA cannot ascertain whether there is a licensed user in the vicinity thereof, and thus transmission power is generally varied depending on authentication with the WS AP to avoid interference with the licensed user. That is, the transmission power before the authentication is lower than that after the authentication.

Hereinafter, the authentication refers to that the WS STA searches the WS AP and performs the synchronization and association from the WS AP. The authenticated WS STA becomes a client of the WS AP. If the authentication is completed, the WS STA is under control of the WS AP, which may be represented in terms of association or membership, etc.

For specific description, let the maximum transmission power of the WS STA be 50 mW before completing the authentication, but 100 mW after completing the authentication in light of effective isotropic radiated power (EIRP).

Due to the foregoing constraint of transmission power, coverage imbalance may arise in the existing scanning procedure.

Figure 2:
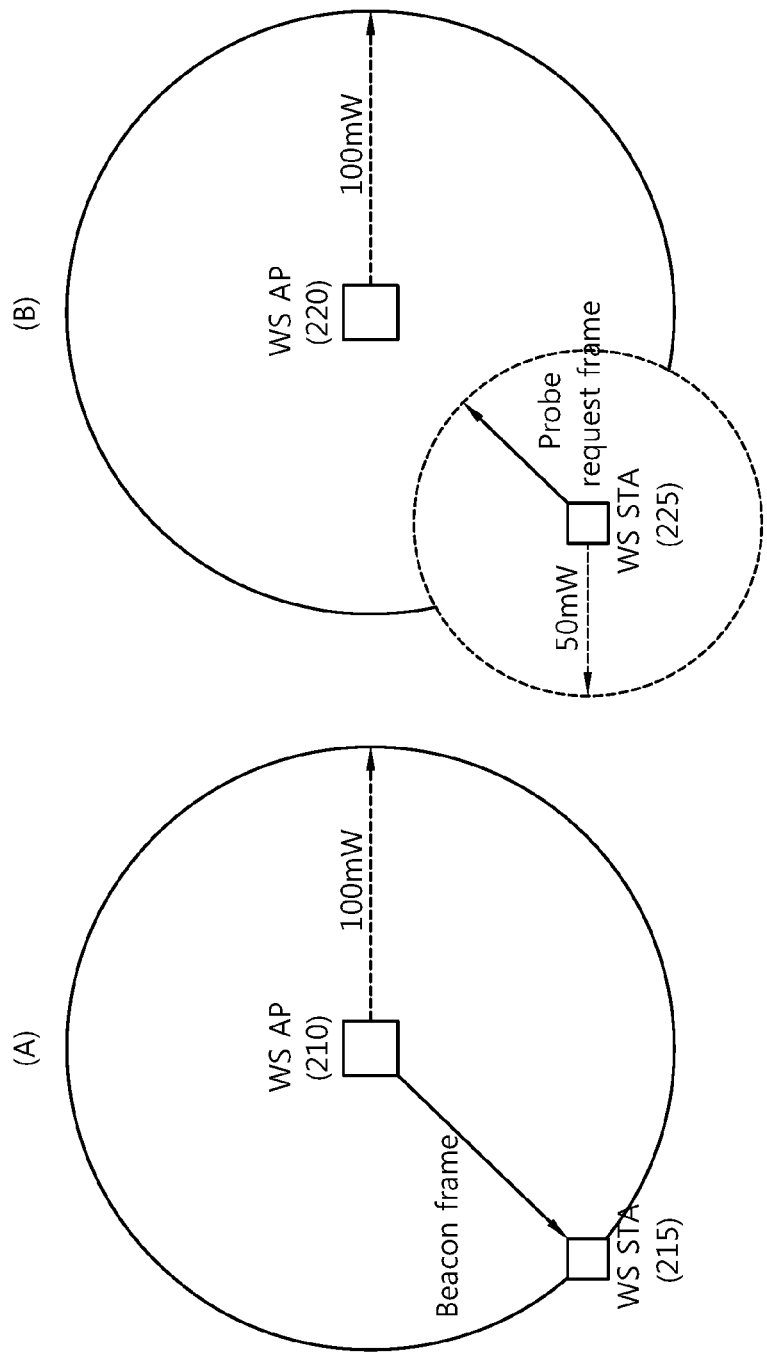
FIG. 2 shows coverage imbalance in passive scanning and active scanning.

FIG. 2 shows coverage imbalance in passive scanning and active scanning. (A) and (B) of FIG. 2 show the passive scanning and the active scanning, respectively.

Referring to (A) of FIG. 2, the WS AP 210 transmits a beacon frame to the WS STA 215. The beacon frame may be transmitted at 100 mW as the maximum transmission power of the WS AP 210. The WS STA 215 receiving the beacon frame can recognize whether the WS AP 210 is present.

Referring to (B) of FIG. 2, the WS STA 225 transmits a probe request frame to the WS AP 220. However, the WS STA 225 uses the transmission power of 50 mW because the authentication is not completed, and the WS AP 220 cannot receive the probe request frame. Since the WS AP 220 does not transmit a probe confirm frame to the WS STA 225, the WS STA 225 cannot grasp the presence of the WS AP 220.

As described above, due to the constraint of the transmission power before and after the authentication, scanning coverage of the active scanning is smaller than that of the passive scanning. The passive scanning can receive service from the WS AP 210 within the coverage corresponding to 100 mW, but the active scanning cannot search the WS AP within the coverage corresponding to the transmission power exceeding 50 mW.

To solve the coverage imbalance between the passive scanning and the active scanning, there are proposed exemplary embodiments as follows.

Figure 3:
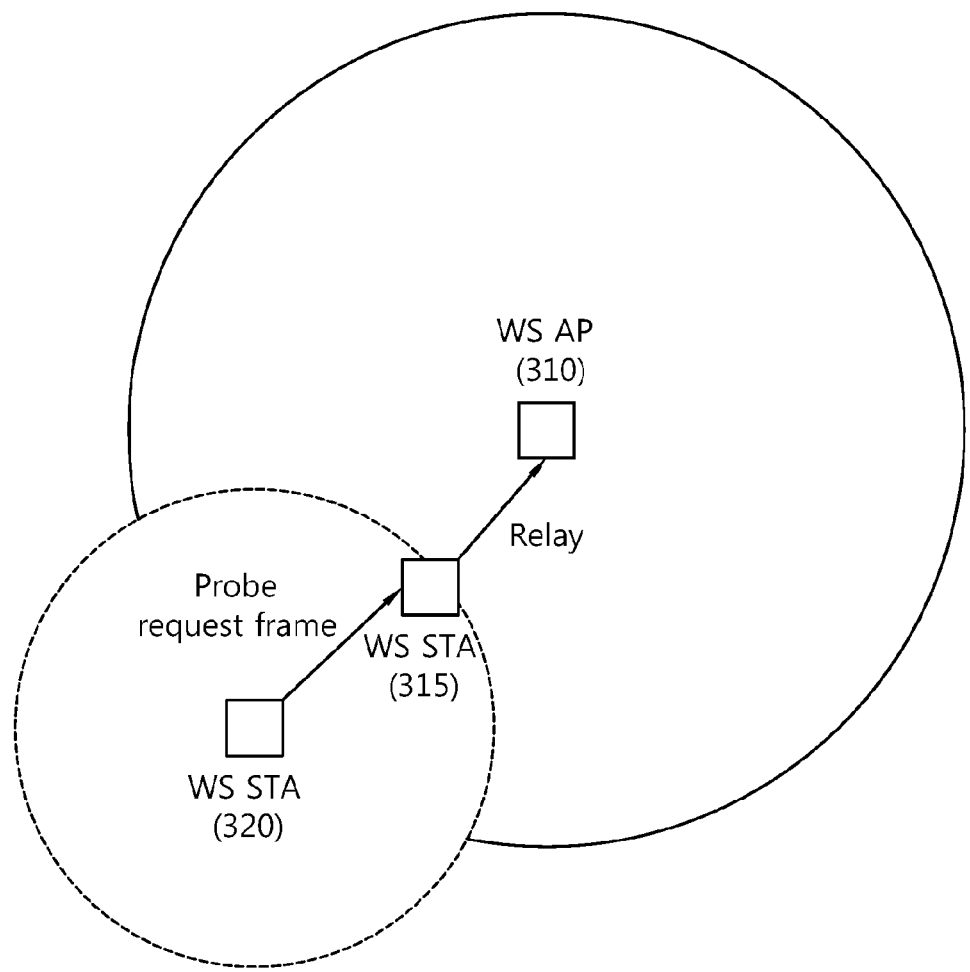
FIG. 3 shows the active scanning according to an exemplary embodiment of the present invention.

FIG. 3 shows the active scanning according to an exemplary embodiment of the present invention.

A first WS STA 320 transmits a probe request frame. A second WS STA 315 relays the probe request frame to a WS AP 310.

Here, the first WS STA 320 initiating a probe request will be called a probe requesting STA, and the second WS STA 315 relaying the probe request will be called a probe relaying STA or a scanning STA.

The probe relaying STA may be an STA of which authentication has been completed or has not been completed by the WS AP 310.

The probe request frame is relayed to the WS AP 310 through the probe relaying STA, which results in enlarging the scanning coverage of the first WS STA 320.

Here, the WS AP 310 responding to the probe request frame will be called a responder STA.

Hereinafter, 1-hop involving one probe relaying STA will be described by way of example, but not limited thereto. Alternatively, K-hops may be used like the probe requesting STA→a first probe relaying STA→ . . . → a Kth probe relaying STA→→ the WS AP.

Figure 4:
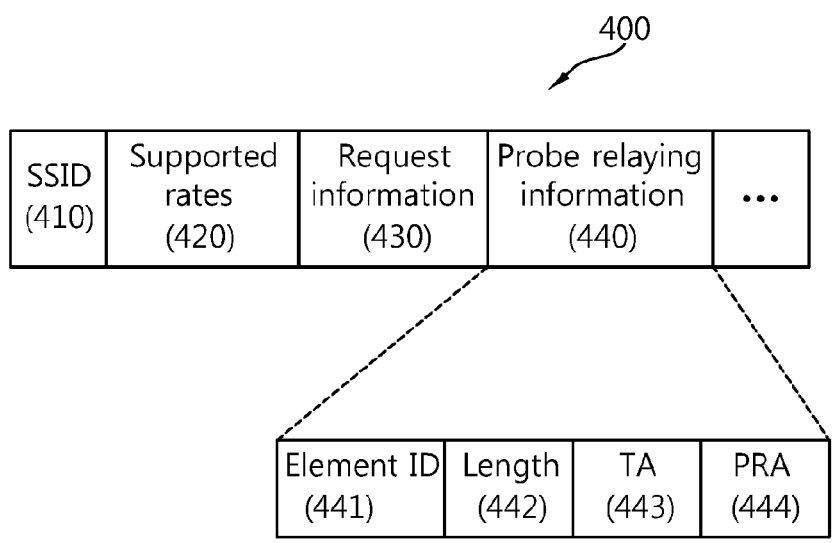
FIG. 4 shows a probe request frame according to an exemplary embodiment of the present invention.

FIG. 4 shows a probe request frame according to an exemplary embodiment of the present invention.

The probe request frame 400 includes a basic service set identification (SSID) field 410, a supported rates field 420, a request information field 430, and a probe relaying information field 440.

The SSID field 410 indicates an identifier of BSS or IBSSS.

The supported rate field 420 indicates a data rate that can be supported.

The request information field 430 is used by the responder STA to request information to be included in the probe response frame.

The probe relaying information field 440 includes frame relaying information that instructs the probe relaying STA receiving the probe request frame to relay it to the WS AP to receive the probe response frame. Thus, the WS STA that receives the probe relaying information from the probe requesting STA or from another probe requesting STA relays the corresponding probe request frame to the WS AP.

The probe relaying information field 440 may include an element ID field 441, a length field 442, a transmitter address (TA) field 443, and a probe requesting STA address (PRA) field 444.

The element ID field 441 indicates the probe relaying information.

The length field 442 indicates the length of the probe relaying information field 440.

The TA field 443 indicates the address of the WS STA or WS AP that transmits the corresponding frame. When the probe request frame is initially transmitted, the TA field 443 may denote the address of the probe requesting STA. When the probe requesting frame is relayed, the TA field 443 may denote the address of the probe relaying STA.

The PRA field 444 indicates the address of the probe requesting STA that initiates the probe request.

If the probe request frame is transmitted by the probe requesting STA, the TA field 443 has the same address as the PRA field 444. However, if the probe request frame is relayed by the probe relaying STA, the address of the TA field 443 is different from that of the PRA field 444. This is because the PRA field 444 is not varied but the TA field 443 becomes the address of the probe relaying STA.

Figure 5:
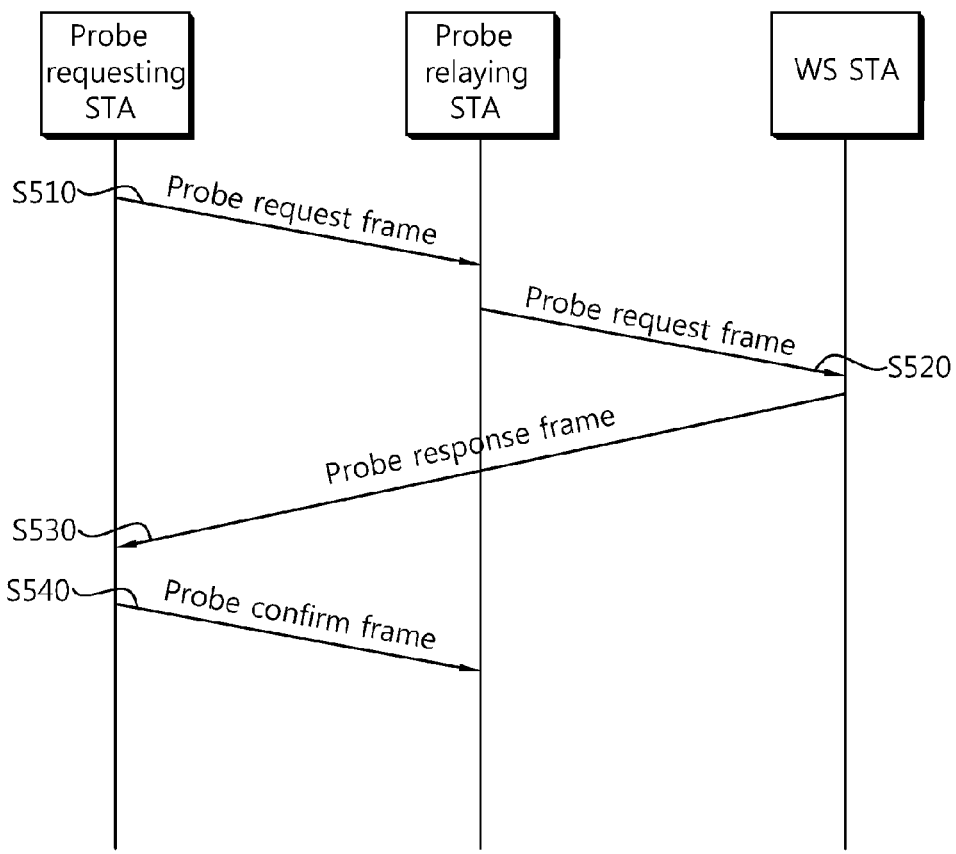
FIG. 5 is a flowchart showing a scanning method according to an exemplary embodiment of the present invention.

FIG. 5 is a flowchart showing a scanning method according to an exemplary embodiment of the present invention.

The probe requesting STA, ascertaining that a channel of the TV WS is unoccupied after the channel sensing, transmits the probe request frame (S510). The probe relaying STA relays the probe request frame (hereinafter, referred to as a "relay probe request frame") to the WS AP (S520). In response to the probe request frame, the WS AP transmits a probe response frame to the probe requesting STA (S530).

In response to the probe response frame, the probe requesting STA transmits a probe confirm frame (S540). The probe relaying STA may relay the probe confirm frame to the WS AP.

The probe request frame includes probe relaying information. The probe relaying STA relays the probe request frame if the probe request frame includes the probe relaying information, but may not relay the probe request frame if the probe request frame does not include the probe relaying information.

Also, the relay probe request frame relayed by the probe relaying STA includes the probe relaying information. The probe relaying STA can set the TA field in the probe relaying information to its own address, and then performs unicast of a reset relay probe request frame.

To prevent interference with data frame exchange between other STAs and the AP within one BSS, an interframe space time between the received probe request frame and the relay probe request frame may be equal to or larger than a distributed interframe space (DIFS).

The WS AP that receives the relay probe request frame performs the unicast of the probe response frame to the probe requesting WS STA. The unicast refers to sending of the probe response frame by setting a receiver address (RA) of the probe response frame to an address of a certain STA. The interframe space time taken in receiving the relay frame request frame and transmitting the probe response frame may be set as a short interframe space (SIFS).

The probe requesting STA that receives the probe response frame may broadcast a probe confirm frame for notifying that the scanning procedure is normally performed. At this time, the BSSID field of the probe confirm frame may be set as a BSSID of the WS AP that transmits the probe response frame.

The probe confirm frame may include the probe relaying information. The probe relaying STA that receives the probe request frame may determine whether the WS AP within the BSS where the probe relaying STA belongs has already sent the probe response frame, on the basis of the probe relaying information included in the probe confirm frame. The probe relaying STA may discard a pending probe request frame if the BSSID of the AP where the probe relaying STA is connected is equal to the BSSID of the probe confirm frame and the address of the probe requesting STA within the probe request frame is equal to the address of the probe requesting STA within the probe confirm frame.

The probe request frame may be received by a plurality of STAs. If the plural STAs are all employed in relaying the probe request frame, it is not efficient. Therefore, there is a need for preventing relay overlap between the plural STAs.

After receiving the probe request frame, the STA previously stores the probe request frame in a buffer so as to relay the probe request frame. At this time, since the STA has not performed the relay, this STA is called a relay pending STA. If receiving the probe confirm frame due to the relay of another probe relaying STA before relaying the probe request frame, the relay pending STA discards the buffered probe request frame.

Figure 6:
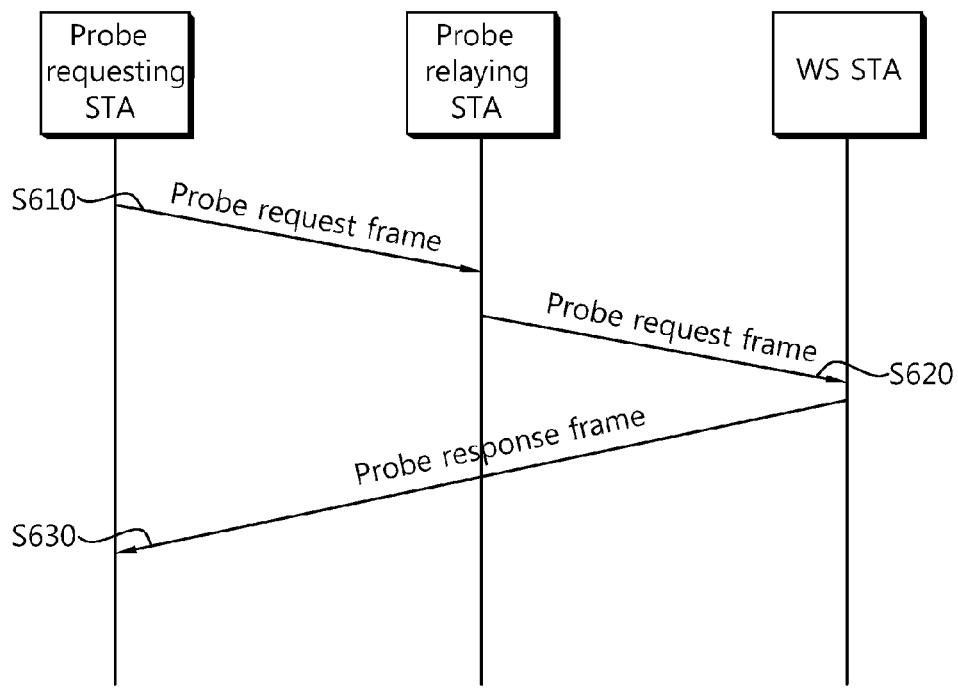
FIG. 6 is a flowchart of a scanning method according to another exemplary embodiment of the present invention.

FIG. 6 is a flowchart of a scanning method according to another exemplary embodiment of the present invention.

After the channel sensing, the probe requesting STA ascertaining that the channel of the TV WS is unoccupied transmits the probe request frame (S610).

The probe relaying STA relays the probe request frame to the WS AP (S620). The probe request frame includes probe relaying information. The probe relaying STA relays the probe request frame if the probe request frame includes the probe relaying information. If the probe request frame does not include the probe relaying information, the probe relaying STA may not relay the probe request frame.

The probe relaying STA relays the received probe request frame only when the TA and the PRA of the probe request frame are the same. Otherwise, the probe relaying STA discards the received probe request frame.

The WS AP transmits the probe response frame in response to the probe request frame (S630). The probe response frame may undergo unicast or be broadcasted.

The probe relaying STA may receive the probe request frame from the probe requesting STA, or receive the relay probe request frame from another probe relaying STA. The probe relaying STA relays only the probe request frame received from the probe requesting STA, and does not relay the relay probe request frame received from another probe relaying STA.

There may be a relay pending STA for relaying the probe request frame received from the probe requesting STA. The relay pending STA discards the pending probe request frame if the PRA of the pending probe request frame is equal to the PRA of the probe request frame of another STA (i.e., the relay probe request frame). If receiving the probe request frame relayed by another probe relaying STA before relaying the buffered probe request frame, the relay pending STA discards the buffered probe request frame.

Figure 7:
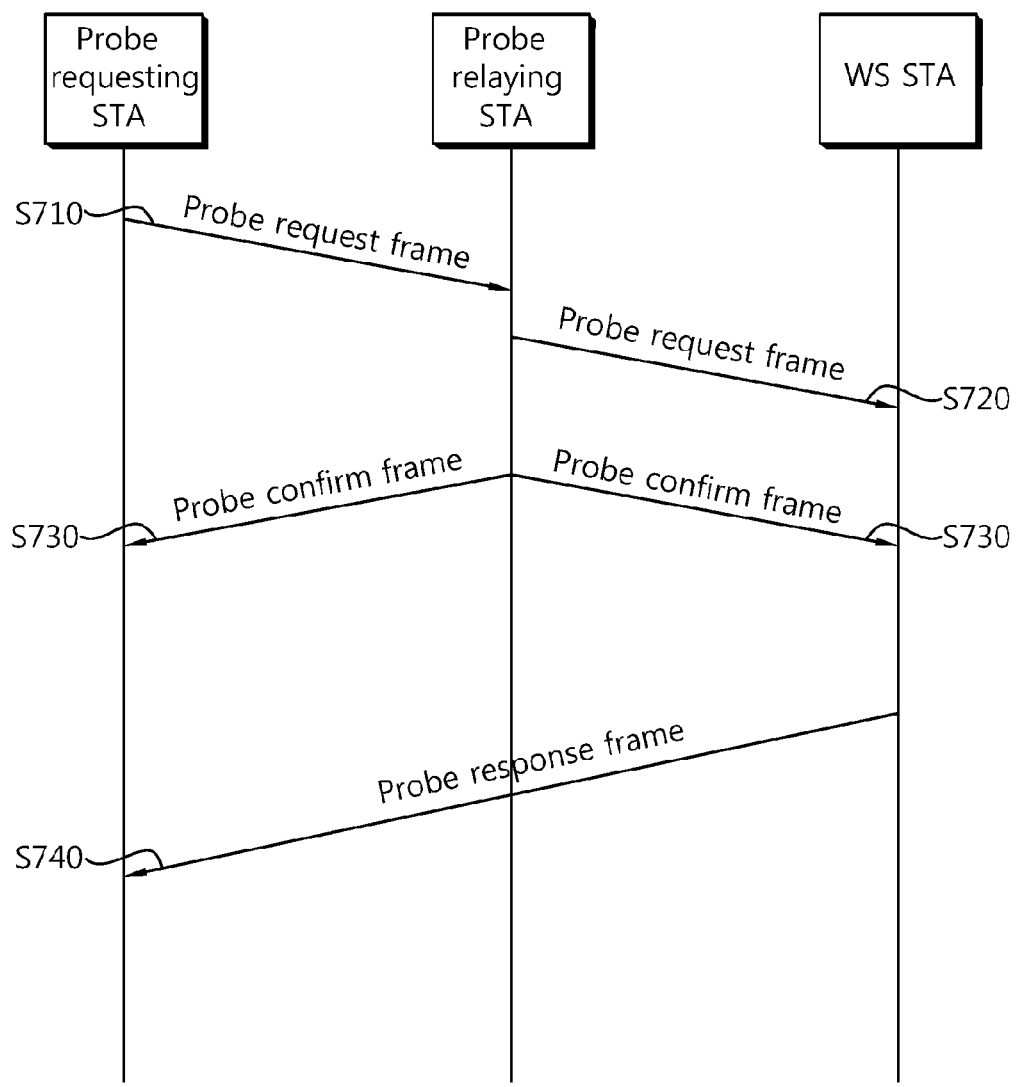
FIG. 7 is a flowchart of a scanning method according to still another exemplary embodiment of the present invention.

FIG. 7 is a flowchart of a scanning method according to still another exemplary embodiment of the present invention.

After the channel sensing, the probe requesting STA ascertaining that the channel of the TV WS is unoccupied transmits the probe request frame with regard to the unoccupied channel (S710).

The probe relaying STA relays the probe request frame to the WS AP (S720). Further, the probe relaying STA transmits a probe relay confirm frame for notifying that the relay has been performed (S730). The probe relay confirm frame is used for preventing other STAs from relaying the probe request frame, and may be broadcasted.

To prevent interference with data frame exchange between other STAs and the AP within one BSS, an interframe space time between the received probe request frame and the relay probe request frame may be equal to or larger than a distributed interframe space (DIFS).

Figure 8:
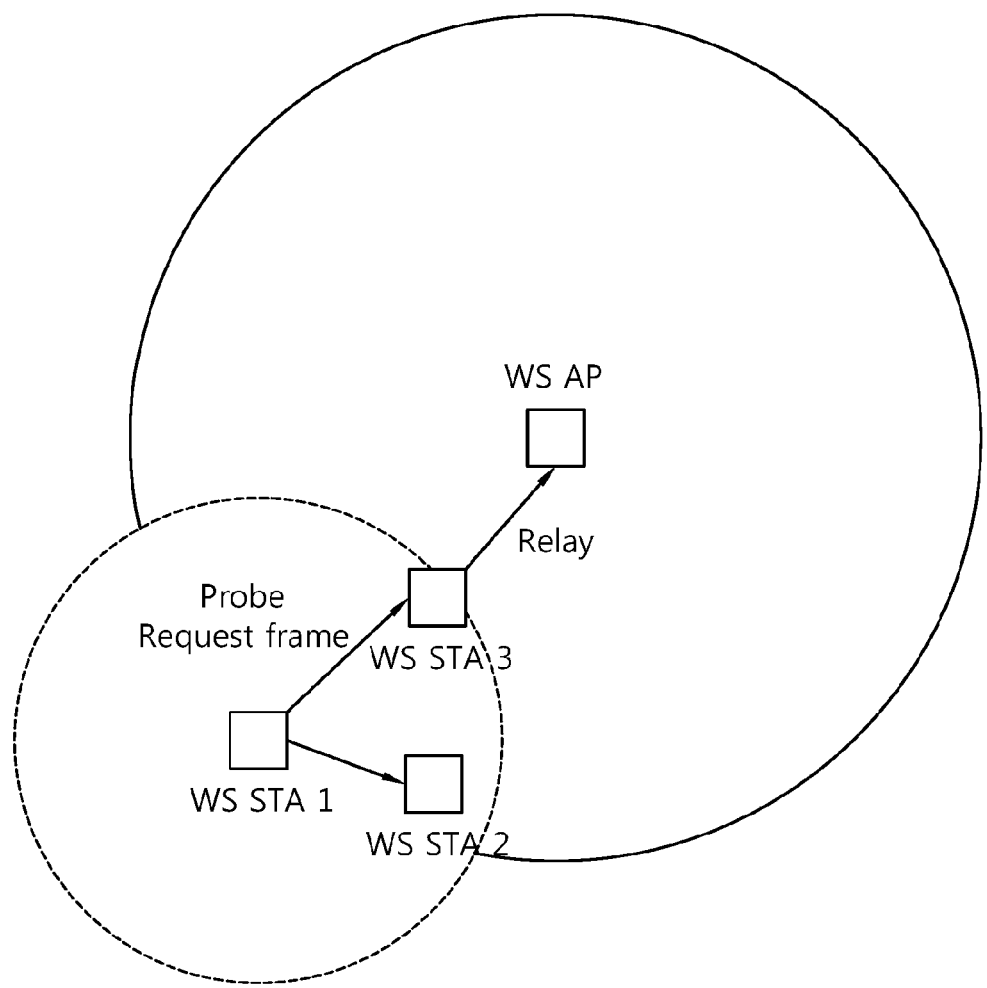
FIG. 8 more specifically shows the exemplary embodiment of FIG. 7.

FIG. 8 more specifically shows the exemplary embodiment of FIG. 7.

There are a WS STA2 and a WS STA3 within active scanning coverage of a WS STA1. If the WS STA1 transmits a probe request frame, the WS STA2 and the WS STA3 may receive the probe request frame.

One between the WS STA2 and the WS STA3, which first occupies a wireless channel, is used in relaying the probe request frame. In this exemplary embodiment, let the WS STA3 be used as the probe relaying STA and relay the probe request frame to the WS AP. A probe relaying information field is included within the relay probe request frame transmitted by the WS STA3. The TA field of the probe relaying information field indicates the address of the WS STA3, and the PRA field indicates the WS STA1.

The WS STA2 has to recognize that the WS STA3 first relay the probe request frame. This is because the WS STA2 may doubly transmit the probe request frame if the WS STA2 does not recognize that the probe request frame has been relayed.

Accordingly, after relaying the probe request frame, the WS STA3 sends the probe relay confirm frame for notifying that the WS STA3 has relayed the probe request frame.

The probe relay confirm frame may include a PRA field that indicates the address of the probe relaying STA. The WS STA2 that receives the probe relay confirm frame may determine that the pending probe request frame is normally relayed and discard the pending probe request frame if the address of the probe relaying STA within the probe request frame is equal to the address of the probe relaying STA within the probe relay confirm frame.

In addition to the PRA field, the probe relay confirm frame may further include a TA field that indicates the address of the STA transmitting the probe relay confirm frame. In a 1-hop method where the relay is performed once, only the PRA field of the probe relay confirm frame is enough to prevent unnecessary relay. However, in a multi-hop method where the relay is performed two or more times, the TA field has to be included within the probe relay confirm frame in addition to the PRA field.

The WS STA having the pending probe request frame receives a probe relay confirm frame broadcasted by another WS STA. If the probe requesting STA designated by the pending probe request frame is equal to the probe requesting STA designated by the probe relay confirm frame, and if the transmitter address (TA) of the pending probe request frame is equal to the TA of the probe relay confirm frame, the WS STA may discard the pending probe request frame.

Referring back to FIG. 7, the WS AP transmits the probe response frame in response to the probe request frame (S740). The probe response frame may be broadcasted. The relay pending STA being on standby for receiving and relaying the probe request frame may discard the pending probe request frame as the probe response frame is received from the WS AP.

After receiving the probe request frame including the probe relaying information, the relay pending STA is on standby for relaying the probe request frame. If the transmitter address of the received probe relay confirmation frame is equal to the transmitter address of the probe request frame remaining in the buffer, the relay pending STA discard the buffered probe request frame. Also, if receiving the probe response frame from the WS AP to which the buffered probe request frame is relayed, the relay pending STA discards the buffered probe request frame.

Figure 9:
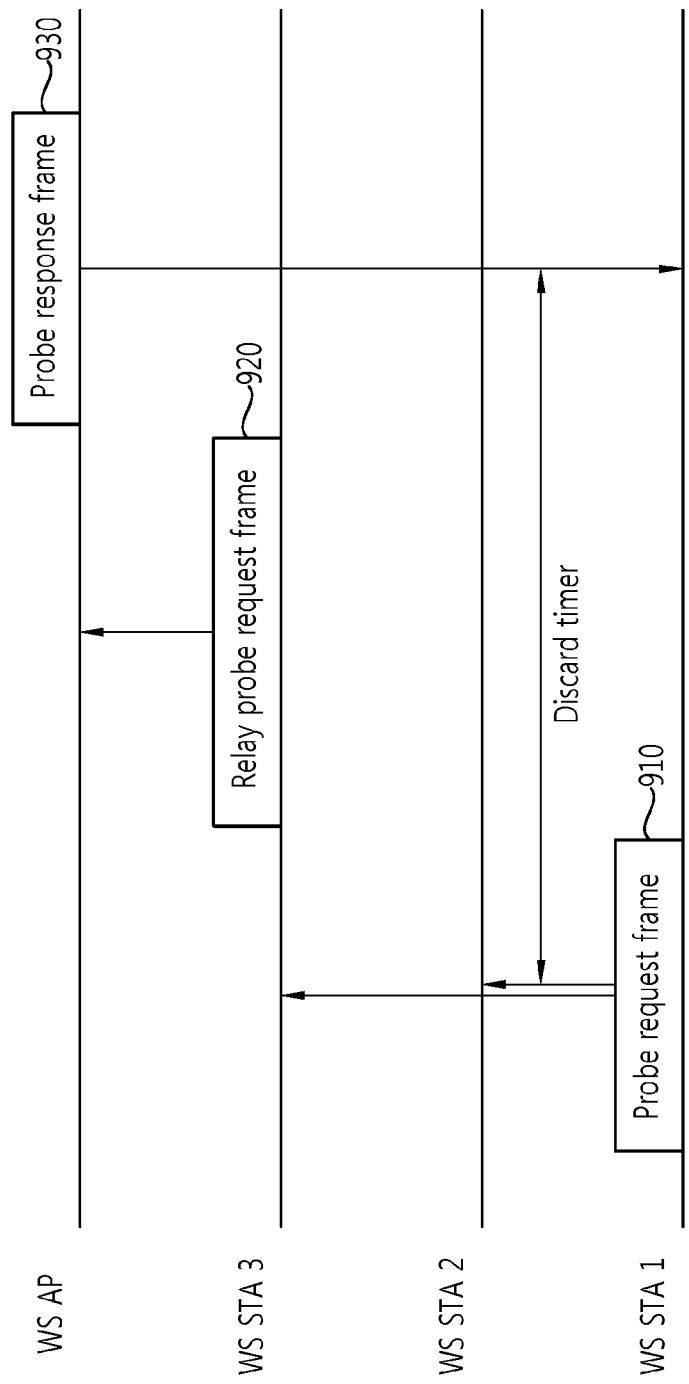
FIG. 9 is a flowchart of a scanning method according to an exemplary embodiment of the present invention.

FIG. 9 is a flowchart of a scanning method according to an exemplary embodiment of the present invention.

There are a WS STA2 and a WS STA3 within active scanning coverage of a WS STA1. If the WS STA1 transmits a probe request frame 910, the WS STA2 and the WS STA3 may receive the probe request frame 910. Here, the WS STA3 becomes the probe relaying STA, and relays a relay probe request frame 920 to the WS AP.

When the WS STA2 receives the probe request frame 910, a discard timer starts. The WS STA2 stores the probe request frame 910 in a buffer so as to relay the probe request frame 910, and starts the discard timer. If the probe request frame has not been relayed yet until the discard timer expires, the probe request frame 910 is discarded from the buffer.

If a probe response frame 930 is received from the WS AP while the discard timer operates, the probe request frame 910 is discarded from the buffer and the discard timer is stopped.

The discard timer may be applied to the foregoing exemplary embodiments of FIGS. 5 through 7. The relay pending STA stores the probe request frame in order to relay the probe request frame, and starts the discard timer. If a buffer discarding condition is satisfied in the exemplary embodiments of FIGS. 5 through 7 while the discard timer operates, the probe request frame is discarded from the buffer. If the discard timer expires before relaying the probe request frame, the probe request frame is discarded from the buffer.

Even though the AP transmits the probe response frame or another STA transmits the probe relay confirm frame, the relay pending STA may not receive the frame. In this case, the relay pending STA may continuously try to access a channel in order to relay the buffered probe request frame, and thus perform an unnecessary relay. Accordingly, through the discard timer is employed to prevent the unnecessary relay and manage the buffer more efficiently.

The AP may designate an STA within the BSS to relay the probe request frame. That is, the AP may designate only a certain STA to perform the relay, and prevent the plurality of STAs from relaying a plurality of probe request frames.

Meanwhile, because the scanning coverage of the WS STA applicable to the TV WS band is constrained, the probe request frame may not be successfully transmitted to the WS AP at the active scanning. To solve such a transmission failure, the WS STA may repetitively transmit the probe request frame two or more times.

Figure 10:
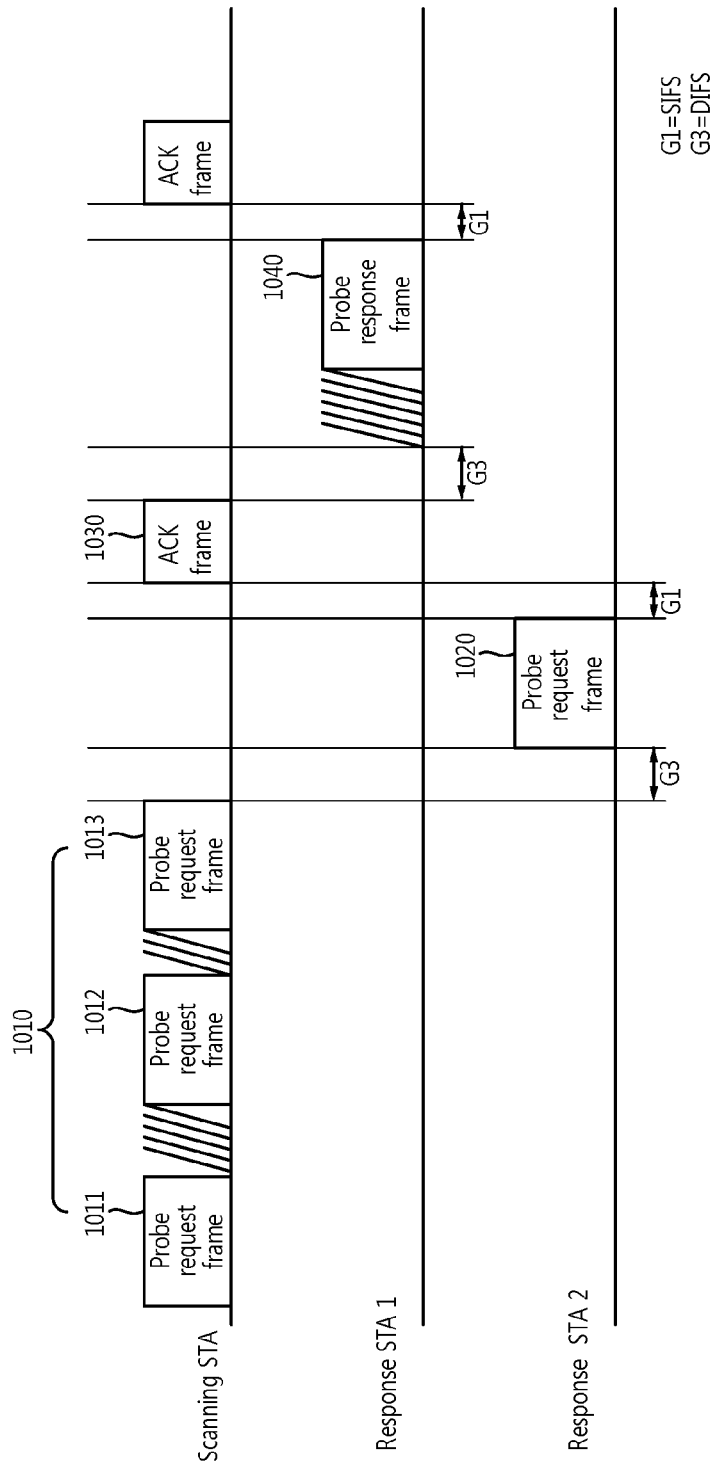
FIG. 10 shows an example of using an aggregated probe request frame.

FIG. 10 shows an example of using an aggregated probe request frame.

The scanning STA initiating the active scanning transmits an aggregated probe request frame 1010. The aggregated probe request frame 1010 refers to that plural probe request frames are aggregated. In this exemplary embodiment, the aggregated probe request frame 1010 includes three successive probe request frames 1011, 1012 and 1013.

A response STA2 that, which receives at least one of the probe request frames that belong to the aggregated probe request frame 1010, transmits a probe response frame 1020 in response to the probe request frame. The scanning STA transmits an acknowledgement (ACK) frame 1030 in confirm of receiving the probe response frame. Also, the response STA2 may transmit a probe response frame 1040.

Figures 11, 12:
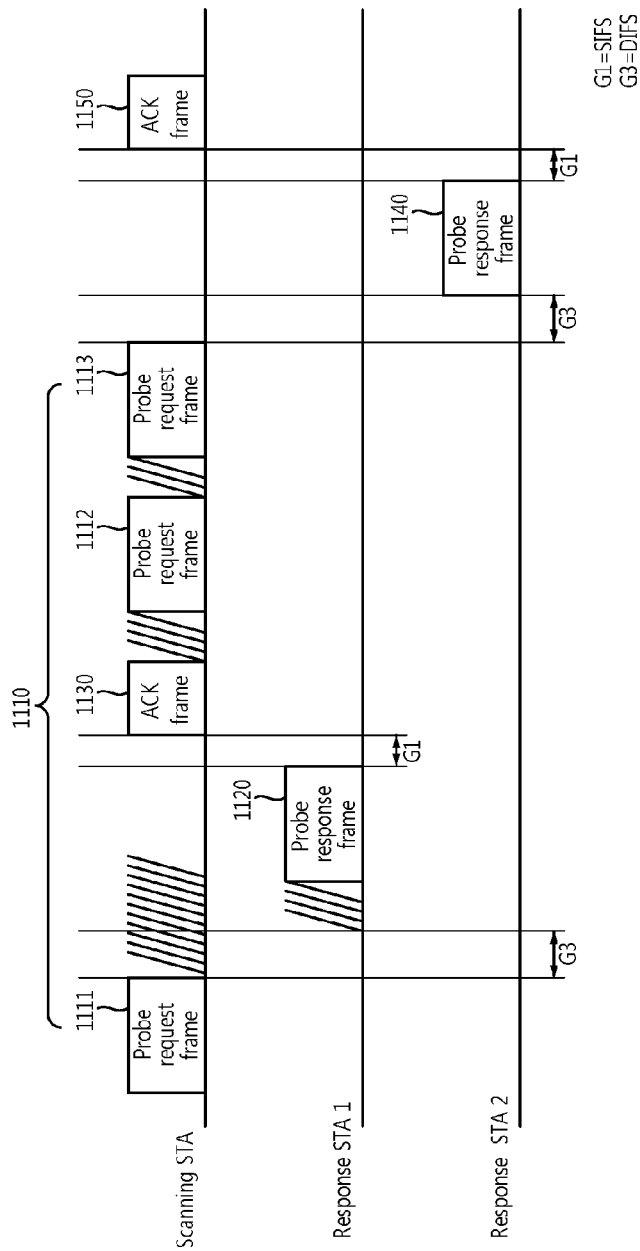
FIG. 11 shows another example of using an aggregated probe request frame.
FIG. 12 shows an example of a format of a probe request frame in an aggregated probe request frame.

FIG. 11 shows another example of using an aggregated probe request frame.

An aggregated probe request frame 1110 includes three probe request frames 1111, 1112 and 1113. The probe request frames within the aggregated probe request frame may individually perform a channel access procedure. At this time, a contention backoff window may have a size of 0.

The scanning STA initiating the active scanning transmits a first probe request frame 1111. The response STA1 receiving the first probe request frame 1111 transmits a probe response frame 1120, and the scanning STA transmits the ACK frame 1130.

The scanning STA transmits the second probe request frame 1112 and the third probe request frame 1113. The response STA2 transmits the probe response frame 1140, and the scanning STA transmits an ACK frame 1150.

The response STA has no need of responding to each of the probe request frames within the aggregated probe request frame. The response STA may send one probe response frame even though the probe request frames of the aggregated probe request frame are received. To this end, the plurality of probe request frames may include information for notifying that the plurality or probe request frames belong to one aggregated probe request frame.

FIG. 12 shows an example of a format of a probe request frame in an aggregated probe request frame. A probe request frame 1200 may include an SSID field 1210, a supported rates field 1220, a request information field 1230 and a probe request ID field 1240.

The probe request ID field 1240 indicates a probe request ID showing that the probe request frames 1200 belong to one aggregated probe request frame. The probe request ID may be an identifier showing that the scanning STA performs specific active scanning.

Although the response STA receives a plurality of probe request frames, the response STA responses with one probe response frame if the probe request ID is one.

According to an alternative exemplary embodiment, the probe request ID field may not be included in the probe request frame, and a sequence control field of a MAC header may be used for notifying whether there is one probe request.

The sequence control field denotes a sequence number. The response STA can recognize whether the scanning STA transmits one probe request frame, on the basis of the sequence number and the transmitter address.

In the foregoing exemplary embodiments, there is proposed a scanning method for solving the coverage imbalance in the state that another relaying STA or the WS AP exists within the scanning coverage of the probe requesting STA initiating the scanning. However, the WS AP or the relaying STA may not exist within the scanning coverage of the probe requesting STA.

The coverage imbalance of the WS STA is caused by the transmission power constraint of the WS STA before the authentication. Accordingly, it is possible to solve the coverage imbalance by setting the transmission power of the WS STA initiating the active scanning to be equal to the transmission power of after the authentication.

The WS STA that does not receive any signal from the WS AP has constrained transmission power since there is no information about regulation or the like in a relevant channel. Therefore, if the WS AP informs the WS STA of the maximum allowable transmission power, the WS STA can increase the scanning coverage by transmitting the probe request frame within the maximum allowable transmission power informed by the WS AP.

In general, information about the transmission power is transmitted as being contained in a beacon frame. The WS STA performing the passive scanning obtains the information about the transmission power by receiving the beacon frame. According to IEEE 802.11 WLAN standards, it may be taken much time to access the AP since a transmission gap between the beacon frames has a default value of 100 ms.

Figure 13:
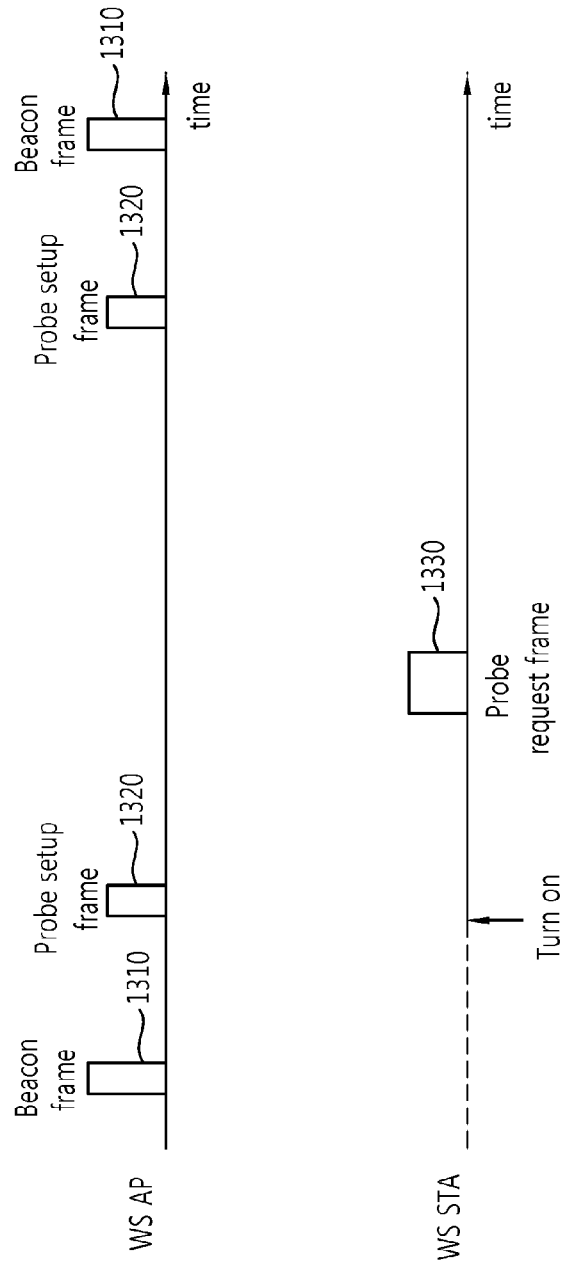
FIG. 13 shows a scanning method according to an exemplary embodiment of the present invention.

FIG. 13 shows a scanning method according to an exemplary embodiment of the present invention.

The WS AP transmits a beacon frame 1310 per beacon period. The WS AP transmits a probe setup frame 1320 per probe setup period.

The probe setup frame contains information about the maximum transmission power of the probe request frame allowable to the WS STA. The WS STA transmits a probe request frame 1330 within the maximum allowable transmission power.

The probe setup period is smaller than the beacon period. Thus, the probe setup frame 1320 is transmitted per shorter period than that of the beacon frame. Thus, the active scanning may be performed within larger scanning coverage and shorter time than the passive scanning.

Figure 14:
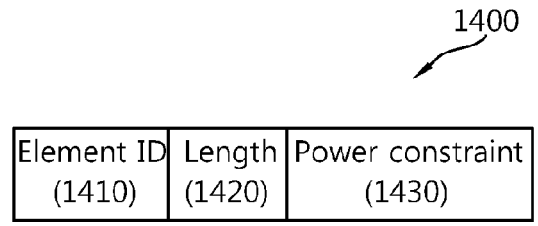
FIG. 14 shows an example of a format of a probe setup frame.

FIG. 14 shows an example of a format of a probe setup frame.

The probe setup frame 1320 includes a power constraint information field 1400. The power constraint field 1400 includes an element ID field 1410, a length field 1420, and a power constraint field 1430.

The element ID field 1410 indicates an identifier of the power constraint information field 1400. The length field 1420 indicates the length of the power constraint information field 1400.

The power constraint field 1430 indicates the maximum transmission power allowable for the active scanning. The power constraint field 1430 denotes allowable transmission power used by the WS STA in transmitting the probe request frame. The WS STA can transmit the probe request frame within the transmission power constraint shown by the power constraint field 1430 of the probe setup frame 1320.

Meanwhile, the foregoing power constraint information field 1400 may be transmitted using a measurement pilot frame defined in section 7.4.7.2 of IEEE 802.11K "Amendment 1: Radio Resource Measurement of Wireless LANs" disclosed in June 2008. The measurement pilot frame is a frame transmitted for supporting the scanning of the STA by separately informing the STA of some information included in the beacon frame.

Figure 15:
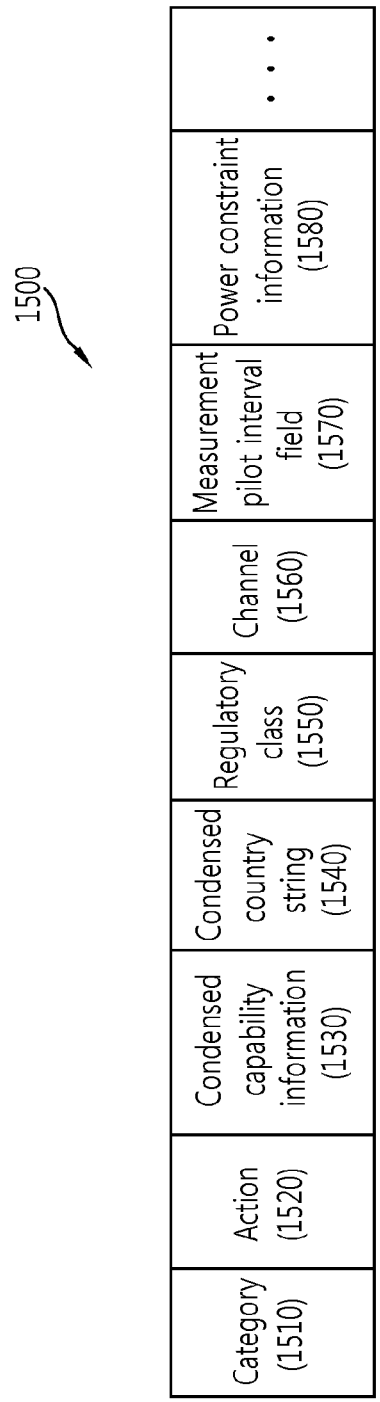
FIG. 15 is a block diagram showing an example of a format of a measurement pilot frame according to an exemplary embodiment of the present invention.

FIG. 15 is a block diagram showing an example of a format of a measurement pilot frame according to an exemplary embodiment of the present invention.

A measurement pilot frame 1500 includes a category field 1510, an action field 1520, a condensed capability information field 1530, a condensed country string field 1540, a regulatory class field 1550, a channel field 1560, a measurement pilot interval field 1570, and a power constraint information field 1580.

The power constraint information field 1580 indicates the maximum transmission power allowable for the active scanning, which may be the same as the format of FIG. 14. Also, the other fields are the same as the existing fields.

Figure 16:
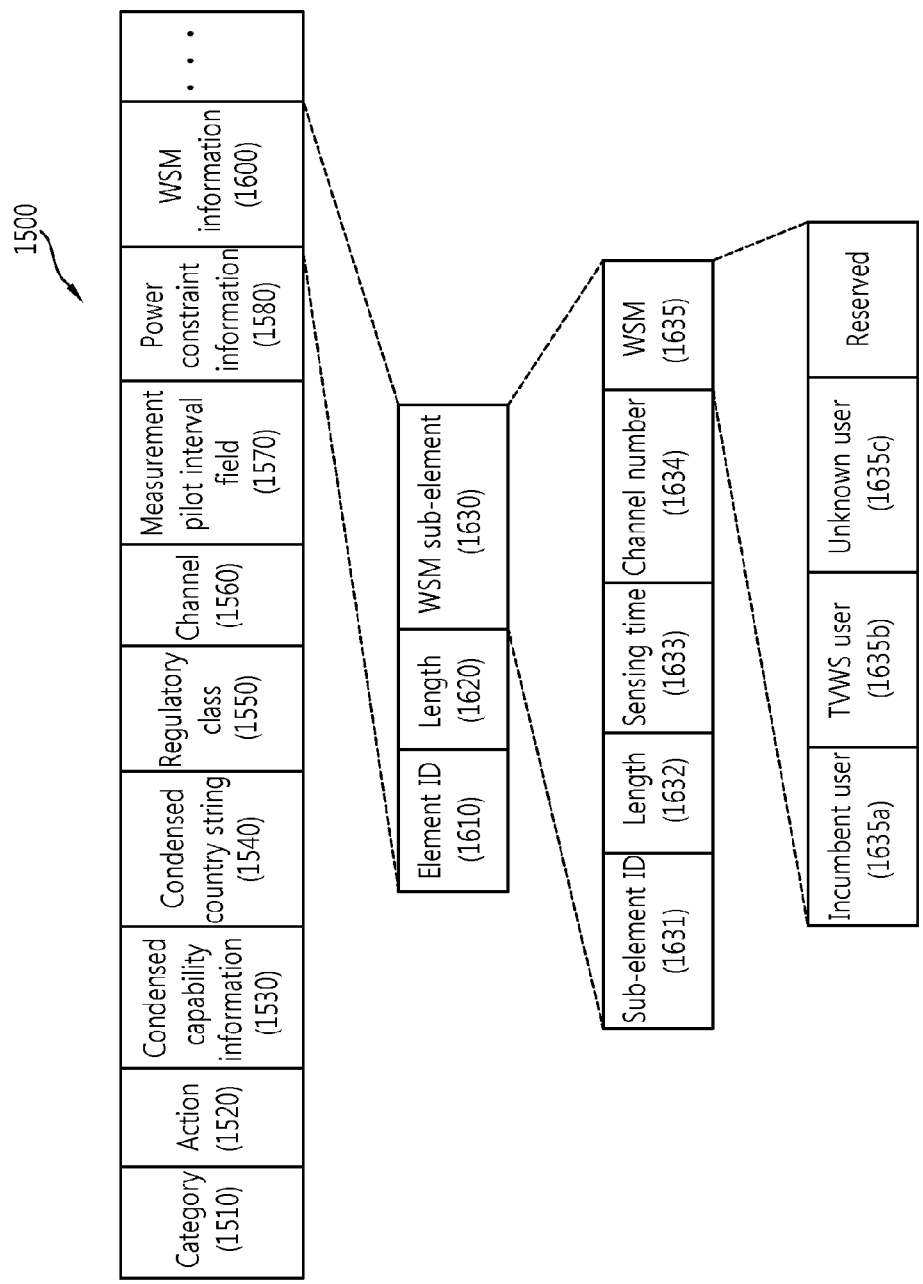
FIG. 16 is a block diagram showing an example of a format of a measurement pilot frame according to another exemplary embodiment of the present invention.

FIG. 16 is a block diagram showing an example of a format of a measurement pilot frame according to another exemplary embodiment of the present invention. As opposed to the exemplary embodiment of FIG. 15, the measurement pilot frame 1500 in this exemplary embodiment further includes a white space map (WSM) information field 1600.

The WS STA performs the spectrum sensing before transmitting the probe request frame through the TV WS band. To reduce load due to the spectrum sensing of the WS STA and efficiently support the scanning procedure, the WS AP may transmit the WSM information field 1600 to the WS STA. Here, the WSM information field 1600 indicates a white space map (WSM) as information about recognized channels. WSM information contains information about sensing results that the WS AP has with regard to all channels within the TV WS band.

While a channel field 1560 of the existing measurement pilot frame indicates an operating channel, a channel field 1560 of an extended measurement pilot frame may indicate the operating channel or a list of channels to be operated. However, the channel field 1560 may be omitted since the WSM information field 1600 may have more comprehensive information than the information shown by the channel field 1560.

The WSM information field 1600 includes an element ID field 1610, a length field 1620, and a WSM sub-element field 1630. The element ID field 1610 indicates that it is WSM information, and the length field 1620 indicates the length of the WSM information field 1600. The WSM sub-element field 1630 refers to sub-elements indicating channel information about respective channels. If there are k channels, the WSM sub-element field 1630 becomes a sequence of k sub-elements and is included in the WSM field 1600.

The WSM sub-element field 1630 includes a sub-element ID field 1631, a length field 1632, a sensing time field 1633, a channel number field 1634, and a WSM field 1635.

The sub-element ID field 1631 denotes that a corresponding element is a WSM sub-element. The length field 1632 denotes the length of the WSM sub-elements. The sensing time field 1633 indicates time when the spectrum sensing is performed with regard to a relevant channel. If the spectrum sensing has been performed a long time ago, the WS STA has to be informed of such information because reliability of results from sensing the relevant channel is lowered. The sensing time may be represented by a timing synchronization function (TSF) time. The channel number field 1634 indicates the number of a relevant channel to which the spectrum sensing is applied.

The WSM field 1635 is a field where the results of the spectrum sensing are shown, which shows whether the relevant channel is occupied or not and shows who occupies the channel if the channel is occupied.

The WSM field 1635 includes an incumbent user subfield 1635a, a TV WS user subfield 1635b, and an unknown user subfield 1635c. The incumbent user subfield 1635a indicates whether an incumbent user is sensed in the relevant channel. The TV WS user subfield 1635b indicates whether a TV WS user (i.e., an unlicensed user) is sensed in the relevant channel. The unknown user subfield 1635c indicates that a user occupying the relevant channel is sensed but what type of user occupies the channel is unknown.

For example, if each sub field of the WSM field 1635 is of 1 bit, it can be set up as follows.

TABLE 1

| Incumbent user | TV WS user | Unknown user | meaning |
| --- | --- | --- | --- |
| 0 | 0 | 0 | No user |
| 1 | 0 | 0 | Occupied by incumbent user |
| 0 | 1 | 0 | Occupied by TV WS user |
| 0 | 0 | 1 | Occupied but unknown user |

Through the WSM information, the WS STA can determine whether each channel is occupied by the incumbent user, and further determine which channel the WS AP is present. The channel occupied by the incumbent user is not used in performing the active scanning.

In the foregoing exemplary embodiment, the location and sequence of the fields within each frame are given for example, but not limited thereto. Further, the name of the field and the name of frame are given for example to show each function of the frame and the frame, and may be changed variously. Also, some fields not used in the proposed method may be omitted.

Figure 17:
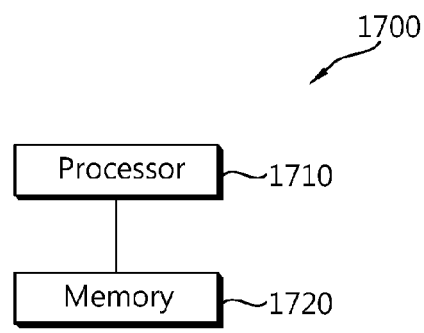
FIG. 17 is a block diagram showing a wireless apparatus according to an exemplary embodiment of the present invention.

FIG. 17 is a block diagram showing a wireless apparatus according to an exemplary embodiment of the present invention. The wireless apparatus 1700 may be a part of the AP or non-AP STA. The wireless apparatus 1700 can perform the active scanning and support the TV WS.

The wireless apparatus 1700 may include a processor 1710 and a memory 1720. Here, the processor 1710 and the memory 1720 may be functionally connected. The wireless apparatus 1700 may be a part of the probe relaying STA that relays the receive probe request frame.

The memory 1720 stores a received frame. When the probe request frame is received, it can be stored in the memory 1720.

The processor 1710 realizes the function of the foregoing probe relaying STA. The processor 1710 determines whether to discard the probe request frame, and determines to relay the probe request frame to the AP if the probe request frame is not discarded.

In the foregoing exemplary embodiments shown in FIGS. 5 through 16, the function of the probe relaying STA may be achieved by the processor 1710.

The wireless apparatus 1700 may be a part of the WS AP. In the foregoing exemplary embodiments shown in FIGS. 5 through 16, the function of the WS AP may be achieved by the processor 1710.

The processor 1710 may include application-specific integrated circuit (ASIC), other chipsets, a logic circuit and/or a data processor. The memory 1720 may include a read-only memory (ROM), a random access memory (RAM), a flash memory, a memory card, a storage medium, and/or other storage devices. If the exemplary embodiment is realized by software, the foregoing method may be achieved by a module (procedure, function, etc.) for performing the foregoing functions. The memory 1720 may be internally or externally provided in the processor 1710, and connected to the processor 1710 by a well-known means.

In the foregoing exemplary embodiments, the methods were described on the basis of a series of steps or flowchart based on blocks, but not limited to the above order of the steps. A certain step may be performed in different order or may be performed simultaneously with another step. Also, it will be appreciated by those skilled in the art that the steps shown in the flowcharts are not exclusive but a new step may be added or one or more steps may be deleted from the flowchart without affecting the scope of the invention.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for active scanning in a wireless local area network (WLAN), the method comprising:
   receiving a probe request frame comprising probe request relaying information from a probe requesting station (STA) initiating the active scanning;
   determining whether to discard the probe request frame when a frame related to relaying of the probe request frame is received;
   determining whether to relay the probe request frame; and
   relaying the probe request frame to an access point (AP) if it is determined to relay the probe request frame, the probe request relaying information comprising:
      a transmitter address field that indicates an address of an STA transmitting the probe request frame; and
      a probe requesting STA address field that indicates an address of the probe requesting STA,
   wherein discarding of the probe request frame is determined by comparing one of the transmitter address field or the probe requesting STA address field with information included in the frame related to the probe request frame.

2. The method according to claim 1, wherein an address of the STA indicated by the transmitter address field is equal to an address of the probe requesting STA.

3. The method according to claim 1, wherein an address of the STA indicated by the transmitter address field is not equal to an address of the probe requesting STA.

4. The method according to claim 1, wherein the probe request frame is relayed if the probe request frame is not discarded.

5. The method according to claim 4, further comprising:
   receiving a probe confirm frame to confirm that the active scanning is performed,
   wherein the probe request frame is discarded if an address of a probe requesting STA within the probe confirm frame is equal to an address of the probe requesting STA.

6. The method according to claim 4, further comprising:
   receiving a new probe request frame,
   wherein the probe request frame is discarded if an address of a probe requesting STA within the new probe request frame is equal to an address of the probe requesting STA.

7. The method according to claim 4, further comprising:
   receiving a probe response frame from the AP,
   wherein the probe request frame is discarded if an address of a probe requesting STA within the probe response frame is equal to an address of the probe requesting STA.

8. The method according to claim 4, further comprising:
   receiving a probe relay confirm frame for notifying that a probe request is relayed,
   wherein the probe relay confirm frame comprises a transmitter address field indicating an address of a STA transmitting the probe relay confirm frame, and
   wherein the probe request frame is discarded if an STA indicated by the transmitter address field within the probe request relaying information is equal to an STA indicated by the transmitter address field within the probe relay confirm frame.

9. The method according to claim 4, wherein:
   a discard timer starts when the probe response frame is received; and
   the probe request frame is discarded when the discard timer expires.

10. A wireless apparatus for performing active scanning in a wireless local area network (WLAN), the wireless apparatus comprising:
   a memory configured to store a received probe request frame; and
   a processor connected to the memory, and configured to:
      determine whether to discard the probe request frame when a frame related to relaying of the probe request frame is received; and
      determine to relay the probe request frame to an access point (AP) if the probe request frame is not discarded, the probe request frame comprising probe request relaying information, the probe request relaying information comprising:
         a transmitter address field that indicates an address of an station (STA) transmitting the probe request frame; and
         a probe requesting STA address field that indicates an address of the probe requesting STA,
      wherein discarding of the probe request frame is determined by comparing one of the transmitter address field or the probe requesting STA address field with information included in the frame related to the probe request frame.

11. The wireless apparatus according to claim 10, wherein the processor discards the probe request frame if an address of a probe requesting STA within a probe confirm frame, which confirms that the active scanning is performed, is equal to an address of the probe requesting STA.

12. The wireless apparatus according to claim 10, wherein the processor discards the probe request frame if an address of a probe requesting STA within a new probe request frame is equal to an address of the probe requesting STA.

13. The wireless apparatus according to claim 10, wherein the processor discards the probe request frame if an address of a probe requesting STA within a probe response frame received from the AP is equal to an address of the probe requesting STA.

14. The wireless apparatus according to claim 10, wherein the processor discards the probe request frame if a STA indicated by a transmitter address field indicating an address of an STA transmitting a probe relay confirm frame within the probe relay confirm frame for notifying that a probe request is relayed is equal to an STA indicated by the transmitter address field within the probe request relaying information.

15. The wireless apparatus according to claim 10, wherein:
a discard timer starts when the probe response frame is received; and
the probe request frame is discarded when the discard timer expires.

* * * * *